United States Patent [19]

Chiklis

[11] 4,147,668

[45] Apr. 3, 1979

[54] CONDUCTIVE COMPOSITIONS AND COATING COMPOSITIONS FOR MAKING THE SAME

[75] Inventor: Charles K. Chiklis, Lexington, Mass.

[73] Assignee: Polaroid Corporation, Cambridge, Mass.

[21] Appl. No.: 811,471

[22] Filed: Jun. 30, 1977

[51] Int. Cl.² .................... H01B 1/04; H01B 1/02; H01B 1/06
[52] U.S. Cl. .................... 252/503; 252/506; 252/511; 252/512; 252/513; 252/514; 252/518
[58] Field of Search .......... 252/511, 503, 512, 506; 260/880 B; 428/509

[56] References Cited

U.S. PATENT DOCUMENTS

| | | | |
|---|---|---|---|
| 2,649,425 | 8/1953 | Hulse | 428/509 X |
| 3,281,383 | 10/1966 | Zelinski et al. | 260/880 B X |
| 3,281,624 | 10/1966 | Patchen | 252/511 X |
| 3,734,780 | 5/1973 | Bilhorn et al. | 429/162 |
| 3,950,292 | 4/1976 | Cooper | 260/880 B X |
| 3,992,483 | 11/1976 | Willis | 260/880 B X |

*Primary Examiner*—Benjamin R. Padgett
*Assistant Examiner*—E. Suzanne Parr
*Attorney, Agent, or Firm*—John W. Ericson

[57] ABSTRACT

Electrically conductive compositions comprising conductive particles dispersed in a matrix of a radial teleblock copolymer of styrene and butadiene, and coating compositions for making the same in sheet form and comprising dispersions of conductive particles in a solution of a radial teleblock copolymer of styrene and butadiene in an organic solvent.

23 Claims, 3 Drawing Figures

U.S. Patent  Apr. 3, 1979  4,147,668
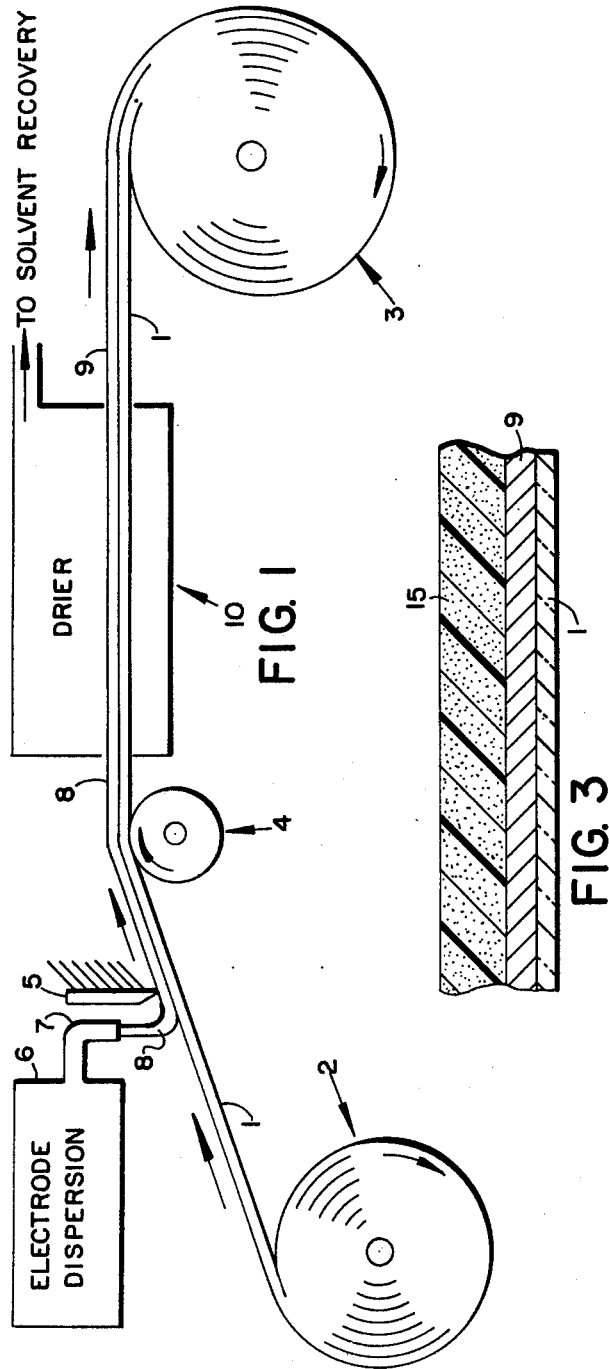
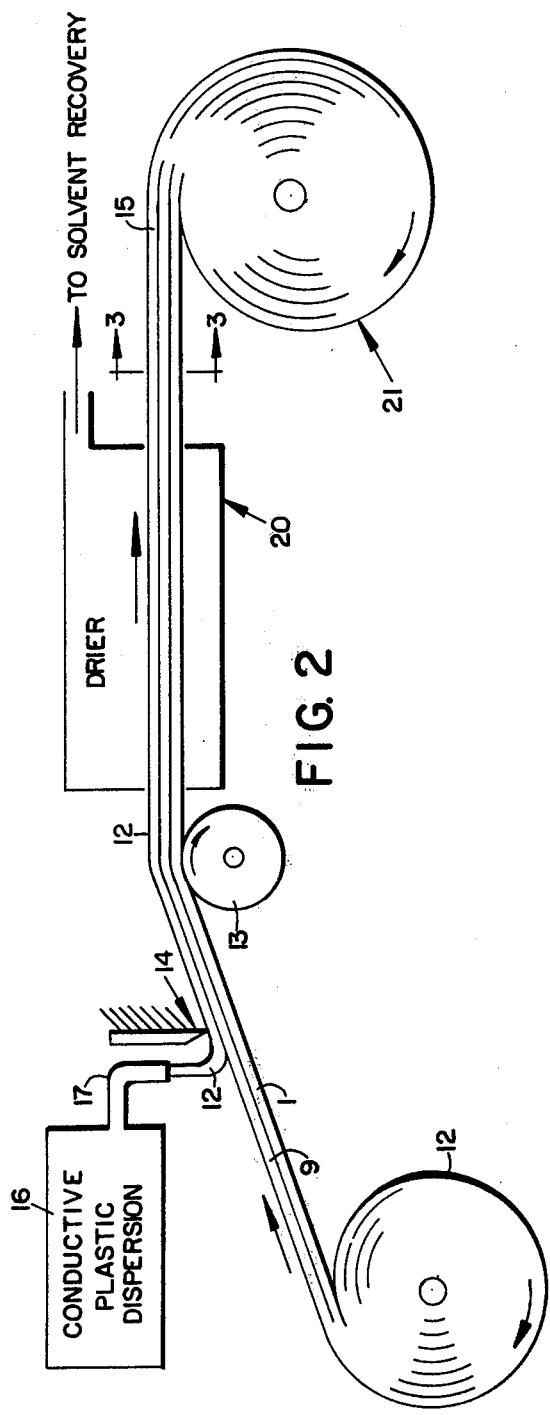

CONDUCTIVE COMPOSITIONS AND COATING COMPOSITIONS FOR MAKING THE SAME

This invention relates to electrically conductive compositions, and particularly to novel conductive compositions containing a radial teleblock copolymer of styrene and butadiene, and coating compositions for forming the conductive compositions in thin sheet form.

Conductive compositions are used in a variety of electrical components; as the example of particular interest here, in laminar batteries of the kind formed of thin, flat cells connected in series and terminated by thin, flat conductive plastic sheets, and commonly having anodes and/or cathodes formed of both conductive and electrochemically active particles in a binder matrix.

A conventional conductive plastic film widely used as an intercell connector or current collector in batteries of the kind described above is a vinyl film filled with carbon black and sold under the trademark Condulon by Pervel Industries, Inc. Other materials that have been proposed for the purpose are listed in U.S. Pat. Nos. 3,734,780, 3,741,814 and 3,880,669. In U.S. Pat. No. 3,880,669, a method of making a conductive electrode bearing material is described in which a solvent containing electronically conductive plastic strip is contacted with a solvent containing electrode mix, and the composite strip dried to remove the solvent. A number of polymers and solvents are suggested as suitable, including butadiene-styrene resins in general.

In copending U.S. Application for Letters Patent Ser. No. 811,469, filed concurrently herewith by Stanley M. Bloom, Charles K. Chiklis and Gordon F. Kinsman for Electrical Cells and Batteries and Methods of Making the Same, a cell construction is described in which a triplex laminate of cellophane with a layer of zinc powder adhered together and to the cellophane with a polymeric binder, and conductive plastic adhered to the zinc layer, is employed as a subassembly. The specific compositions described as preferred in application Ser. No. 811,469 for the manufacture of triplex laminate form the subject matter of this application.

Briefly, this invention is organized about the discovery that a radial teleblock copolymer of styrene and butadiene is an especially useful matrix for use in the manufacture of conductive compositions. In practicing the invention, the copolymer is dissolved in an organic solvent, and conductive particles are dispersed in the solution to form a coating composition. This solution is then cast or extruded on a desired substrate, preferably by doctor blade coating, and dried to remove the solvent, thereby forming a conductive composition.

When a conductive plastic is the desired end product, a major proportion of copolymer and a minor proportion of carbon black are employed. For this purpose, at least 20 percent by weight of carbon black should be included based on the total weight of copolymer and carbon. About 26 percent of carbon black and about 74 percent of copolymer, on the same basis, are presently preferred. Up to 40 percent by weight of carbon black may be included. However, the preferred ratio appears to give the best balance between the electrical and mechanical properties of the composition. When the end product is to be an electrode layer, a major proportion of electrochemically active and at least somewhat electronically conductive particles are included, such as powdered zinc, nickel, cadmium, silver, manganese dioxide or the like. A small proportion of carbon black, i.e., up to about 5 percent by total weight of particles, is preferably included. If the electrochemically active particles are only moderately conductive, such as manganese dioxide or the like, more carbon black, in conventional proportions, should be included. The amount of copolymer included in the electrode forming compositions in accordance with the invention is that least amount needed to bond the particles together and to the desired substrate upon removal of the solvent, leaving an adherent but relatively porous electrode layer accessible by aqueous electrolyte. The particle content of the electrode layer is preferably from 85 to 99 percent by weight of the total weight of the layer.

There are many types of styrene-butadiene copolymers made by emulsion or solution polyermization of varying proportions of styrene and butadiene, and with various molecular weights, molecular structures and physical properties. A description of many of these materials appears in a chapter in *The Vanderbilt RUBBER HANDBOOK*, published in 1968 by R. T. Vanderbilt Company, Inc., New York, New York. The particular copolymer included in the compositions of this invention is a thermoplastic elastomer formed by solution polymerization as a radial teleblock copolymer in which there are discrete domains of elastomeric polybutadiene reversibly joined by interpolymerized thermoplastic but nonelastomeric domains of polystyrene. More specifically, in the polybutadiene domains, several polybutadiene chains extend from a central hub, with each polybutadiene branch terminated by a polystyrene block. The polybutadiene and polystyrene portions are incompatible, so that the copolymer forms a two-phase system consisting of glassy polystyrene interconnected by flexible polybutadiene chains. The polystyrene domains serve to cross-link and reinforce the structure, resulting in an elastomeric network in the nature of a chemically cross-linked rubber, but very different in that the cross-linking mechanism is reversible. In particular, the radial teleblock copolymers are thermoplastic and soluble in many organic solvents; when heated above the softening point, or dissolved in solution, the cross-links are disrupted. However, upon cooling of the molten material, or evaporation of the solvent from a solution, the cross-linked elastomeric structure is restored.

Radial teleblock copolymers of from 50 to 80 parts by weight of butadiene and from 50 to 20 parts by weight of styrene per hundred parts by weight of copolymer are useful in the practice of the invention. The presently preferred ratio is 70 butadiene/30 styrene. A suitable material is available as Solprene 411-C, as made and sold by Philips Petroleum Co., Chemicals Group, Rubber Chemicals Division, of Ohio. Other suitable block copolymers of styrene and butadiene are the Thermolastic Series as made and sold by the Synthetic Rubber Technical Center Division of Shell Oil Co., of Torrance, California, and described, for example, on pages 297–300 of *Modern Plastics Encyclopedia* 1967, published in September, 1966 by McGraw-Hill, Inc., of New York, New York. Other suitable materials are mixtures of a major proportion of a radial teleblock copolymer of styrene and butadiene with a minor proportion of polystyrene, or other modifying resins compatible with the radial teleblock copolymer, in which the copolymer comprises from 70 to 100 percent by weight of the total polymeric material.

The practice of the invention will next be illustrated by specific examples and described with reference to the accompanying drawings, in which:

FIG. 1 is a schematic elevational sketch illustrating the first steps in the process of making a triplex laminate from the compositions of the invention;

FIG. 2 is a schematic elevational sketch illustrating the final steps in the process of making a triplex laminate from the compositions of the invention; and FIG. 3 is a fragmentary cross-sectional elevational sketch, on an enlarged scale, taken essentially along the lines 3—3 of FIG. 2 and showing the several layers of the laminate of FIG. 2 in relatively close proportions to those preferred.

The specific compositions and practices to be described are particularly suitable for the manufacture of a triplex laminate for use in the manufacture of laminar batteries as described in the above cited copending U.S. Application for Letters Patent Ser. No. 811,469.

Referring to FIG. 1, the process of making a triplex laminate according to the invention begins with the coating of a conductive electrode dispersion on a web of separator material. As the separator material, any of those commonly employed in the battery art can be used, such as paper and various woven and non-woven natural and synthetic liquid permeable materials. However, there are particular advantages in the use of regenerated cellulose as the separator in a LeClanche system, and the coating compositions of the invention have been found particularly suitable for coating regenerated cellulose. Accordingly, while it should be understood that the invention in its broader aspects can be practiced with other suitable materials, it will be particularly described in connection with its preferred embodiment in which regenerated cellulose, and specifically a sheet of cellophane free of humectants and plasticizers, is the coated web. A particularly suitable form of cellophane for this purpose is PUD-O cellophane, 1.34 mils in thickness, as made and sold by E. I. DuPont de Nemours & Co. of Wilmington, Del.

As illustrated in FIG. 1, the separator may be conveniently supplied as a web 1 from a supply reel 2, whence, after coating, it is ultimately taken up on a take-up reel 3 that is driven in any conventional manner. As will be obvious to those skilled in the art, intermediate guide, drive and tensioning rolls, idler rolls, reversing rolls and the like may be employed in the path between the supply reel 2 and the take-up reel 3, but as such are conventional in the coating art and not material to the invention, they will not be specifically described.

The web 1 passes from the supply reel 2 over a guide roller 4 so that it moves upward past a coating station comprising a conventional doctor blade 5 that is adjusted to a fixed height in dependence on the thickness of the coating desired. Electrode dispersion to be coated on the cellophane sheet 1 is pumped from a suitable container 6 and deposited by a supply tube 7 as a mass of coating composition 8.

The coated web moves from the guide roller 4 through a conventional dryer schematically indicated at 10, where the coated dispersion 8 is dried in heated air to remove the solvent and form a dry layer 9. In industrial practice, the solvent would preferably be recovered by conventional means, as schematically illustrated. The dried coated product, comprising a layer 9 of electrode particles adhered to the cellophane sheet 1, is taken up on the supply reel, where it may be stored for second coating in a manner to be described. Alternatively, the dried and coated web material may be passed directly to the next coating operation.

The electrode dispersion 8 generally comprises a dispersion of metal particles, for example, zinc, magnesium, silver, cadmium or aluminum particles or the like, depending on the electrochemical system to be used in the batteries to be produced. However, in accordance with the preferred embodiment of the invention, powdered zinc, or powdered zinc, together with a little carbon black, are preferably dispersed in an organic solvent. A polymer is dissolved in the solvent to bind the zinc particles when the solvent is removed.

It has been found essential to use an organic solvent to prepare the electrode dispersion where the dispersion is to be coated on cellophane, because an aqueous dispersion, while readily coated, will, upon drying, cause such distortion of the cellophane that the product may be useless for the purposes here described. Typical organic solvents that have been employed successfully are aromatics, alcohols, ketones and esters. Toluene is the presently preferred solvent.

A composition that has been found especially successful for use as the electrode dispersion 8 is as follows, in percent by weight based on the total weight of coating composition:

| | |
|---|---|
| Powdered zinc | 56.9 |
| Carbon black | 1.7 |
| Polymeric binder | 4.6 |
| Toluene | 36.8 |
| Total | 100.0 |

The polymeric binder in the above composition was a radial teleblock copolymer of 70 parts by weight of butadiene and 30 parts by weight of styrene based on the total weight of polymer and available as Solprene 411-C from Philips Petroleum Company.

The compositon given above, when dried, is 90.0 percent zinc powder, 2.7 percent carbon black, and 7.3 percent copolymer, based on the total weight of dried composition.

Drying conditions in the dryer 10 will, of course, be determined in part by the exact nature of the composition of the electrode dispersion 8, and by the vapor pressure of the chosen solvent or solvent blend employed. For the electrode dispersion described above as the preferred example, a two stage dryer 10 was used, with temperature of 110° F. in the first stage and 120° F. in the second stage. The coating weight is adjusted so that the final thickness of the layer 9 is from about ½ mil to 2 ½ mils, and preferably about 2 mils in total thickness.

The dried coating should be smooth, even, and relatively adherent to the cellophane. In this regard, it is noted that coatings of this type have been attained on cellophane, and that the coated material can readily be handled without damage or loss of the zinc coating while the cellophane is dry.

FIG. 2 illustrates the application of a conductive plastic layer to coated cellophane with a dried zinc layer 9 thereon. This material may be supplied to the coating apparatus from the roll 3, whence it is passed over a guide roll 13 past a coating station at which there is a doctor blade 14.

With the exception of details to be noted, the coating apparatus may be the same as that described above in connection with FIG. 1. In fact, the same apparatus can be used, with suitable adjustment of the doctor blade 14, and of the temperatures in the drier to be described.

A conductive plastic dispersion 12 is supplied from a suitable storage container 16 and is pumped from the container 16 by any conventional means, not shown, through a supply conduit 17, from which it is deposited as a pool on the coating 9 on the cellophane sheet 1.

The wet coating 12 from the coating station is carried through a dryer 20 where it is dried with heated air, as discussed above to form a dry layer 15. It has been found that temperatures in the neighborhood of 200°-210° F. are appropriate for drying the layer 12. The conductive plastic dispersion 12 is preferably coated to a greater thickness than the zinc coating, so that somewhat higher temperatures are desirable because of the increased drying load. From the dryer 20, the triplex laminate, which now has a dry coating 15 of conductive plastic, is taken up on a suitable take-up reel 21 in the manner similar to that described above for the duplex coating of FIG. 1.

The conductive plastic dispersion 12 is preferably a dispersion of carbon particles in an organic solution of a suitable thermoplastic material comprising at least a major proportion by weight of a radial teleblock copolymer of styrene and butadiene. The carbon is preferably carbon black, and most preferably Shawinigan Black as made and sold by Shawinigan Products Corp., of New York, N.Y. An organic solvent is present preferred for use in making up the conductive plastic dispersion 12, for the reason that an aqueous system might wet the cellophane through the zinc and cause undesirable distortion upon drying. A presently preferred coating composition for use as the dispersion 12 is as follows, in percent by weight based on the total weight of dispersion:

| | |
|---|---|
| Carbon black | 6.5 |
| Elastomer | 18.6 |
| Toluene | 74.9 |
| Total | 100.0 |

The elastomer used was Solprene 411-C, described above. This composition dried to a composition of 25.9 percent carbon black and 74.1 percent elastomer, based on the total weight of dried conductive plastic 15.

The dried layer 15 has been made and used successfully in thicknesses from ½ mil to about 5 to 7 mils. Very successful batteries have been made with the ½ mil coatings 15, but the presently preferred range is about 3 to 4 mils.

Measurements made on one mil and 4 mil sheets of conductive plastic of the composition given next above indicate that the material is highly conductive, surprisingly so in view of its relatively low carbon content compared with conventional materials such as Condulon conductive film. These materials are generally anisotropic, having a transverse resistivity (through the sheet) higher than the lateral resistivity (along the sheet). For one 4 mil sheet in accordance with the invention, the mean transverse resistivity, from measurements on ten samples from the same run, was found to be 2.64 ohm centimeters, with extreme values of 2.96 and 2.41 ohm centimeters. The mean lateral resistivity of the same ten samples was found to be 1.22 ohm centimeters, with extreme values of 1.29 and 1.15 ohm centimeters. Similar measurements were made on ten samples from a 2 mil coating, and ten samples from a 4 mil coating, both made from a second batch of the same coating composition. Mean values of transverse resistivity were found to be 2.50 ohm-cm for the 4 mil sample and 2.88 ohm-cm for the 2 mil sample; mean values of lateral resistivity were 1.04 ohm-cm for the 4 mil sample and 1.18 ohm-cm for the 2 mil sample. Measurements made with the same apparatus on Condulon film 2 mils in thickness indicated transverse resistivities of from 3.1 to 3.5 ohm-cm, and lateral resistivities of 1.7 to 1.85 ohm-cm.

An electrode dimension commonly employed is 1 7/8 inches by 2 ½ inches. From the resistivity values just given, and the relationship $R = \rho L/A$, where $\rho$ is the resistivity of a conductor, L is the length of the conductor, A is the area of the conductor, and R is the resistance of the conductor, it is readily calculated that the five sheets or layers of 4 mil conductive plastic in accordance with the invention required for a four cell battery would make a total contribution to the internal impedance of the battery of $$\frac{5 \text{ sheets} \times 2.64 \text{ ohm-cm} \times .004 \text{ in} \times 2.54 \text{ cm/in}}{1.875 \text{ in} \times 2.5 \text{ in} \times (2.54 \text{ cm/in})^2} =$$

$$4.43 \times 10^{-3} \text{ ohms.}$$

From the same considerations, using the lowest value for Condulon film, five sheets of 2 mil film would make an impedance contribution of $5 \times 3.1 \times 0.002/1.875 \times 2.5 \times 2.54 = 2.6 \times 10^{-3}$ ohms. A very good four cell battery has an internal impedance of about 0.2 ohms, at a constant load of 3.3 ohms for 0.1 seconds. Thus, the penalty for using 4 mil sheets in accordance with the invention, rather than conventional 2 mil sheets, is only 0.9 percent of the internal impedance of a low impedance battery, whereas the strength, resiliency, resistance to damage, and insurance against pinholes offered by the double thickness is obviously a considerable advantage.

Additional coating weight is desirable, because it is found that the conductive plastic formed is sufficiently conductive that the thickness is not critical, while the added insurance against pinholes makes it easier to manufacture a product of uniformly high quality. If desired, the conductive plastic coating may be applied in two or more sequential layers, with intermediate drying, as another means of minimizing the occurrence of pinholes. FIG. 3 shows the elements of the finished web in approximately realistic proportions relative to those preferably employed.

Following the manufacture of the triplex laminate just described, it may be cut into convenient pieces for the manufacture of batteries, for example, in the manner shown and described in the above-cited copending U.S. Application Ser. No. 811,469. Alternatively, the conductive plastic coating composition and the electrode coating composition may be employed independently and employed to make conductive components in accordance with prior art practices. For example, the conductive plastic coating composition may be coated on a release sheet, such as a sheet of Mylar polyester film, and stripped off after drying for use in the manufacture of laminar cells and batteries in accordance with prior art practices. The electrode coating composition may also be coated on the conductive plastic after the latter has been coated and dried. It is also quite practical to coat the conductive plastic composition on a suitably primed metal sheet, such as a tinned steel or aluminum sheet about 2 mils in thickness, to form end terminal stock for the manufacture of laminar cells and batteries.

A suitable primer for aluminum is described in U.S. application for Letters Patent Ser. No. 801,519, filed on May 31, 1977 by Herbert N. Schlein for Methods and Compositions for Adhering Metal to Plastic and assigned to the assignee of this application. Application Ser. No. 801,519 is incorporated herein by reference for the details of the priming compositions and methods of application. This stock can be patch printed with the electrode coating composition for use in the manufacture of batteries, for example, in the manner shown and described in U.S. Pat. No. 4,019,251, issued on Apr. 26, 1977 to Thomas P. McCole for Flat Battery and Method of Manufacture and assigned to the assignee of this application.

While the invention has been described with respect to the details of particular embodiments many changes and variations will occur to those skilled in the art upon reading this description, and such may obviously be made without departing from the scope of the invention.

Having thus described the invention, what is claimed is:

1. A conductive plastic composition consisting essentially of a dispersion of carbon black in a thermoplastic radial teleblock copolymer of butadiene and styrene containing at least 20 percent by weight of carbon black and the balance copolymer, based on the total weight of said dispersion.

2. A coating composition for use in the manufacture of conductive plastic film, comprising a dispersion of carbon particles in a solution of a radial teleblock copolymer of styrene and butadiene in an organic solvent, said composition containing about 26 percent of carbon and 74 percent of copolymer by weight based on the total weight of carbon and copolymer.

3. A coating composition for use in the manufacture of a conductive composition, comprising a dispersion of conductive particles in a solution of thermoplastic resin in an organic solvent, said resin consisting essentially of from 70 to 100 parts by weight of a teleblock copolymer of butadiene and styrene and from 0 to 30 parts by weight of polystyrene.

4. A conductive composition, comprising a dispersion of conductive particles in a thermoplastic matrix comprising from 70 to 100 percent by weight, based on the weight of matrix, of a teleblock copolymer of styrene and butadiene and from 0 to 30 percent by weight of polystyrene, based on the weight of matrix.

5. The composition of claim 4, in which said conductive particles are present in amounts between 85 and 99 parts by weight per 100 parts by weight of said conductive composition.

6. The composition of claim 4, in which said conductive particles comprise carbon and are present in amounts between 20 and 40 parts by weight per 100 parts by weight of said conductive composition.

7. The composition of claim 5, in which said conductive particles comprise from 95 to 100 parts by weight of zinc and from 0 to 5 parts by weight of carbon.

8. A composition for coating cellophane with a smooth adherent layer of electrode particles in a thermoplastic binder matrix without causing distortion of the cellophane, said composition consisting essentially of a dispersion of electrode particles in a solution of a thermoplastic binder in an organic solvent, said thermoplastic binder consisting essentially of from 70 to 100 parts by weight of a teleblock copolymer of butadiene and styrene and from 0 to 30 parts by weight of polystyrene per 100 parts by weight of binder, and said electrode particles being present in amounts between 85 and 99 parts by weight per 100 parts by weight of particles and binder.

9. The composition of claim 8, in which said copolymer is a copolymer of from 50 to 80 parts by weight of butadiene and from 50 to 20 parts by weight of styrene per 100 parts by weight of copolymer.

10. The composition of claim 9, in which said copolymer is a copolymer of 70 parts by weight of butadiene and 30 parts by weight of styrene.

11. The composition of claim 8, in which said solvent is toluene.

12. A conductive plastic composition consisting of a dispersion of carbon black in a thermoplastic matrix, said matrix comprising at least 70 parts by weight of a radial teleblock copolymer of butadiene and styrene per 100 parts by weight of matrix, said dispersion containing at least 20 percent by weight of carbon black and the balance copolymer, based on the total weight of said dispersion.

13. A composition for coating cellophane with a smooth adherent layer of electrode particles in a thermoplastic binder matrix without causing distortion of the cellophane, said composition comprising a dispersion of electrode particles in a solution of a thermoplastic binder in an organic solvent, said thermoplastic binder comprising from 70 to 100 parts by weight of a radial teleblock copolymer of butadiene and styrene per 100 parts by weight of binder, and said electrode particles being present in amounts between 85 and 99 parts by weight per 100 parts by weight of particles and binder.

14. A coating composition for use in the manufacture of a conductive composition, comprising a dispersion of conductive particles in a solution of thermoplastic resin in an organic solvent, said conductive particles being selected from the class consisting of (a) metal particles, (b) carbon particles, (c) manganese dioxide and carbon particles, and (d) metal and carbon particles, said resin consisting essentially of from 70 to 100 parts by weight of a teleblock copolymer of butadiene and styrene and from 0 to 30 parts by weight of polystyrene.

15. The composition of claim 4, in which said conductive particles consist essentially of from 0 to 5 parts by weight of carbon particles and from 95 to 100 parts by weight of metal particles per 100 parts by weight of said particles, and said particles are present in amounts between 85 and 99 parts by weight per 100 parts by weight of said conductive composition.

16. The composition of claim 4, in which said conductive particles consist essentially of carbon and are present in amounts between 20 and 40 parts by weight per 100 parts by weight of said conductive composition.

17. The composition of claim 15, in which said metal particles consist essentially of zinc.

18. A composition for coating cellophane with a smooth adherent layer of electrode particles in a thermoplastic binder matrix without causing distortion of the cellophane, said composition consisting essentially of a dispersion of electrode particles in a solution of a thermoplastic binder in an organic solvent, said electrode particles consisting essentially of zinc and carbon particles, said thermoplastic binder consisting essentially of from 70 to 100 parts by weight of a teleblock copolymer of butadiene and styrene and from 0 to 30 parts by weight of polystyrene per 100 parts by weight of binder, and said electrode particles being present in amounts between 85 and 99 parts by weight per 100 parts by weight of particles and binder.

19. The composition of claim 18, in which said copolymer is a copolymer of from 50 to 80 parts by weight of butadiene and from 50 to 20 parts by weight of styrene per 100 parts by weight of copolymer.

20. The composition of claim 19, in which said copolymer is a copolymer of 70 parts by weight of butadiene and 30 parts by weight of styrene.

21. The composition of claim 19, in which said solvent is toluene.

22. A conductive plastic composition consisting of a dispersion of carbon black in a thermoplastic matrix, said matrix comprising at least 70 parts by weight of a radial teleblock copolymer of butadiene and styrene per 100 parts by weight of matrix, the balance of said matrix being polystyrene, said dispersion containing from 20 to 40 percent by weight of carbon black and the balance copolymer, based on the total weight of said dispersion.

23. A composition for coating cellophane with a smooth adherent layer of electrode particles in a thermoplastic binder matrix without causing distortion of the cellophane, said composition comprising a dispersion of electrode particles in a solution of a thermoplastic binder in an organic solvent, said electrode particles consisting essentially of from 95 to 100 parts by weight of particles selected from the class consisting of zinc, nickel, cadmium and silver, and from 0 to 5 parts by weight of carbon per 100 parts by weight of particles, said thermoplastic binder consisting essentially of from 70 to 100 parts by weight of a radial teleblock copolymer of butadiene and styrene per 100 parts by weight of binder, the balance of said matrix consisting essentially of polystyrene, and said electrode particles being present in amounts between 85 and 99 parts by weight per 100 parts by weight of particles and binder.

* * * * *